(12) United States Patent
Elgersma et al.

(10) Patent No.: US 11,994,597 B2
(45) Date of Patent: May 28, 2024

(54) SYSTEMS AND METHODS USING CHIP-SCALE ATOMIC CLOCK TO DETECT SPOOFED GNSS

(71) Applicant: Honeywell International Inc., Charlotte, NC (US)

(72) Inventors: Michael Ray Elgersma, Plymouth, MN (US); Ruth Dagmar Kreichauf, River Falls, WI (US)

(73) Assignee: Honeywell International Inc., Charlotte, NC (US)

( * ) Notice: Subject to any disclaimer, the term of this patent is extended or adjusted under 35 U.S.C. 154(b) by 277 days.

(21) Appl. No.: 17/521,693

(22) Filed: Nov. 8, 2021

(65) Prior Publication Data

US 2022/0221589 A1    Jul. 14, 2022

Related U.S. Application Data

(60) Provisional application No. 63/135,607, filed on Jan. 9, 2021.

(51) Int. Cl.
    *G01S 19/21* (2010.01)
(52) U.S. Cl.
    CPC .................... *G01S 19/215* (2013.01)
(58) Field of Classification Search
    CPC .................................................. G01S 19/215
    See application file for complete search history.

(56) References Cited

U.S. PATENT DOCUMENTS

| | | | |
|---|---|---|---|
| 8,847,690 B2 | 9/2014 | Nicholls et al. | |
| 9,348,321 B2 | 5/2016 | Dougan et al. | |
| 9,520,860 B2 | 12/2016 | Whitehead et al. | |
| 9,541,649 B2 | 1/2017 | Leibner et al. | |
| 9,596,073 B1 | 3/2017 | Reyes et al. | |
| 9,709,680 B2 | 7/2017 | Achanta et al. | |
| 10,310,091 B2 | 6/2019 | Trevino et al. | |
| 10,338,229 B2 | 7/2019 | Levy et al. | |
| 10,495,759 B2 | 12/2019 | Leibner et al. | |
| 2014/0111249 A1 | 4/2014 | Whitehead et al. | |
| 2016/0223677 A1 | 8/2016 | Trevino et al. | |
| 2019/0293802 A1 | 9/2019 | Kurby et al. | |
| 2019/0361130 A1 | 11/2019 | Leibner et al. | |
| 2020/0018861 A1* | 1/2020 | Bryson | H02J 1/00 |
| 2021/0311203 A1* | 10/2021 | Reis | G01S 19/38 |
| 2022/0221588 A1 | 7/2022 | Elgersma et al. | |

FOREIGN PATENT DOCUMENTS

| | | |
|---|---|---|
| CN | 105718642 B | 10/2018 |
| CN | 110954925 A | 4/2020 |
| KR | 1020150059469 A | 6/2015 |

(Continued)

OTHER PUBLICATIONS

Kaplan, Elliott D. et al., "Understanding GPS Principles and Applications", Artech House, 2nd ed., 2006 (Year: 2006) (Year: 2006).*

(Continued)

*Primary Examiner* — Cassi J Galt
(74) *Attorney, Agent, or Firm* — Fogg & Powers LLC

(57) ABSTRACT

Systems and methods for operating a navigation system and detecting GNSS spoofing using a chip-scale atomic clock are provided herein.

20 Claims, 7 Drawing Sheets

(56) References Cited

FOREIGN PATENT DOCUMENTS

WO    2019048580 A1    3/2019

OTHER PUBLICATIONS

Major, "The Quantum Beat, Principles and Applications of Atomic Clocks", 2nd Ed., Springer 2010, pp. 164 through 165.
European Patent Office, "Extended European Search Report from EP Application No. 21207262.3", from Foreign Counterpart to U.S. Appl. No. 17/521,675, filed Jun. 9, 2022, pp. 1 through 9, Published: EP.
European Patent Office, "Extended European Search Report from EP Application No. 21207271.4", from Foreign Counterpart to U.S. Appl. No. 17/521,693, filed Jun. 13, 2022, pp. 1 through 8, Published: EP.
Arafin et al., "A Low-Cost GPS Spoofing Detector Design for Internet of Things (IOT) Applications", GLSVLSI '17, May 2017, pp. 161 through 166, ACM.
Bruggemann et al., "Chip Scale Atomic Clocks: Benefits to Airborne GNSS Navigation Performance", International Global Navigation Satellite Systems Society Symposium 2006, Jul. 2006, pp. 1 through 17, IGNSS.
Fernandez et al., "CSAC Characterization and Its Impact on GNSS Clock Augmentation Performance", Sensors 17, Feb. 14, 2017, pp. 1 through 19, MDPI, www.mdpi.com/journal/sensors.
Gasparini et al., "A Digital Circuit for Kitter Reduction of GPS-disciplined1-pps Synchronization Signals", AMUEM 2007, International Workshop on Advanced Methods for Uncertainty Estimation in Measurement, Jul. 2007, pp. 1 through 5, Sardagna, Trento, Italy.
Kim, "Holdover Clock Errors In GPS-Disciplined Chip-Scale Atomic Clock", Proceedings of the 2013 Precise Time and Time Interval Systems and Applications Meeting, Dec. 2013, pp. 101 through 106, ION PTTI 2013.
Kitching, "Chip-scale atomic devices", Applied Physics Reviews 5, 031302, Aug. 14, 2018, pp. 1 through 39.
Krawinkel et al., "Innovation: Better GNSS navigation and spoofing detection with chip-scale atomic clocks", GPS World, Oct. 12, 2016, pp. 1 through 10, https://www.gpsworld.com/innovation-getting-there-safely-with-chip-scale-atomic-clocks/.
Microsemi, "Chip Scale Atomic Clock (CSAC) SA.45s", at least as early as Jan. 5, 2021, pp. 1 through 2, https://www.microsemi.com/product-directory/clocks-frequency-references/3824-chip-scale-atomic-clock-csac.
Microsemi, "Low Noise Chip Scale Atomic Clock User's Guide", Microsemi Frequency & Time Division, Document No. 098-00648-000, Rev. B, Nov. 16, 2015, pp. 1 through 26.
Microsemi, "Low Noise CSAC (LN-CSAC) Low Noise Chip Scale Atomic Clock", at least as early as Jan. 5, 2021, pp. 1 through 2, https://www.microsemi.com/product-directory/embedded-clocks-frequency-references/4518-low-noise-csac-ln-csac.
Microsemi, "Quantum SA.45s CSAC Frequently Asked Questions", Sep. 2016, pp. 1 through 4, Microsemi Corporation.
U.S. Army Mantech, "Chip Scale Atomic Clock (CSAC)", at least as early as Jan. 5, 2021, pp. 1 through 2, The U.S. Army Manufacturing Program, https://www.armymantech.com/CSAClock.php.
U.S. Patent and Trademark Office, "Office Action", U.S. Appl. No. 17/521,675, dated Oct. 10, 2023, pp. 1 through 30, Published: US.

* cited by examiner

SYSTEMS AND METHODS USING CHIP-SCALE ATOMIC CLOCK TO DETECT SPOOFED GNSS

CROSS-REFERENCE TO RELATED APPLICATIONS

This application claims the benefit of U.S. Provisional Application Ser. No. 63/135,607, filed Jan. 9, 2021, and titled "SYSTEMS AND METHODS USING CHIP-SCALE ATOMIC CLOCK TO DETECT SPOOFED GPS," which is hereby incorporated herein by reference.

STATEMENT REGARDING FEDERALLY SPONSORED RESEARCH OR DEVELOPMENT

Subject matter described herein was made with Government support. The Government may have certain rights in the invention corresponding to that subject matter.

BACKGROUND

In an increasingly globalized economy, aircraft serve as the conduit for facilitating global commerce. Vehicles can transport cargo and passengers across vast distances and many actors (people, businesses, governments, airports) depend on timely vehicle travel. In order to safely navigate through various environments and coordinate effective travel routines, vehicles rely on Global Navigation Satellite System (GNSS) aided navigation technology. These systems facilitate fast and accurate determination of position information, such as lateral position and altitude, and time information to the vehicle via a GNSS receiver.

However, relying on GNSS technology does not come without risks. For instance, false signals can be fed to a GNSS receiver instead of the true signals sent by GNSS satellites. As a result, the manipulated signals convey incorrect position or time information (for example, a false position solution or an incorrect clock offset) to the GNSS receiver, which may lead to the vehicle incorporating false information in its navigation aids. Adverse reliance on these "spoofed" signals can lead to a wide variety of serious and potentially deadly consequences, most notably the high risk of crash.

The above phenomenon is known as GNSS spoofing. Left unchecked, GNSS spoofing has the potential to jeopardize confidence in the safe navigation of vehicles, particularly for aircraft travel. GNSS spoofing means the manipulation of GNSS signals before acquisition by a GNSS receiver so that the GNSS receiver determines an incorrect three-dimensional location and/or time. Recently, there has been an increase in documented or suspected instances of GNSS spoofing. Without means for detecting when GNSS signals have been spoofed, a vehicle using GNSS technology incurs a serious risk of losing personnel, goods, or the vehicle itself.

SUMMARY

In an example, a system includes a Global Navigation Satellite System (GNSS) receiver communicatively coupled to an antenna. The GNSS receiver is configured to receive GNSS signals from GNSS satellites via the antenna and output a GNSS time signal. The system further includes a chip-scale atomic clock configured to output a chip-scale atomic clock time signal. The system further includes at least one processor coupled to a memory and communicatively coupled to the GNSS receiver and the chip-scale atomic clock. The at least one processor is configured to determine whether a difference between the GNSS time signal and the chip-scale atomic clock time signal exceeds a threshold, wherein the threshold increases nonlinearly over time until the chip-scale atomic clock is reinitialized. The at least one processor is further configured to, when the difference between the GNSS time signal and the chip-scale atomic clock time signal does not exceed the threshold, estimate a system time signal using the GNSS time signal or the GNSS time signal and the chip-scale atomic clock time signal. The at least one processor is further configured to, when the difference between the GNSS time signal and the chip-scale atomic clock time signal exceeds the threshold, estimate a system time signal without using the GNSS time signal and output an alarm indicating that GNSS spoofing has been detected. The at least one processor is further configured to output the system time signal or a signal indicative of a system time error signal.

In another example, a method includes determining whether a difference between a Global Navigation Satellite System (GNSS) time signal from a GNSS receiver and a chip-scale atomic clock time signal from a chip-scale atomic clock exceeds a threshold, wherein the threshold increases nonlinearly over time until the chip-scale atomic clock is reinitialized. The method further includes estimating a system time signal using the GNSS time signal or the GNSS time signal and the chip-scale atomic clock time signal in response to a determination that the difference between the GNSS time signal and the chip-scale atomic clock time signal does not exceed the threshold. The method further includes, in response to a determination that the difference between the GNSS time signal and the chip-scale atomic clock time signal exceeds the threshold, estimating a system time signal using the chip-scale atomic clock time signal or time and error bounds of the chip-scale atomic clock, and outputting an alarm indicating that GNSS spoofing has been detected. The method further includes outputting the system time signal or a signal indicative of a system time error signal.

In another example, a non-transitory computer readable medium includes computer-executable instructions stored thereon which, when executed by one or more processing devices, cause the one or more processing devices to receive a Global Navigation Satellite System (GNSS) time signal from a GNSS receiver communicatively coupled to an antenna and configured to receive GNSS signals from GNSS satellites via the antenna; receive a chip-scale atomic clock time signal from a chip-scale atomic clock; determine whether a difference between the GNSS time signal and the chip-scale atomic clock time signal exceeds a threshold that increases nonlinearly over time until the chip-scale atomic clock is reinitialized; estimate a system time signal using the GNSS time signal or the GNSS time signal and the chip-scale atomic clock time signal in response to a determination that the difference between the GNSS time signal and the chip-scale atomic clock time signal does not exceed the threshold; estimate a system time signal without using the GNSS time signal and output an alarm indicating that GNSS spoofing has been detected in response to a determination that the difference between the GNSS time signal and the chip-scale atomic clock time signal exceeds the threshold; and output the system time signal or a signal indicative of a system time error signal.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
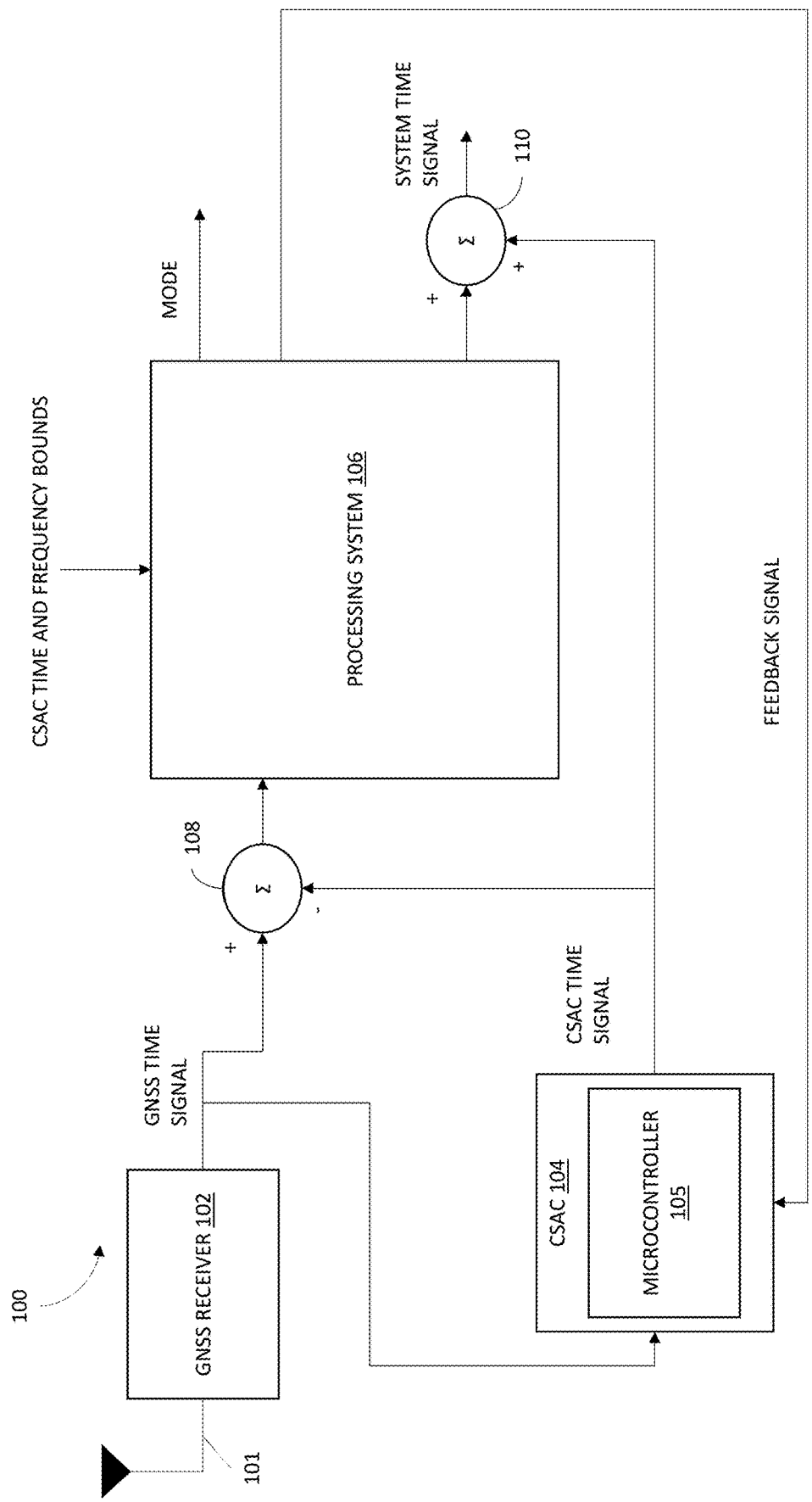
FIG. 1A-1B are block diagrams of example navigation systems.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. The following detailed description is, therefore, not to be taken in a limiting sense.

Some GNSS spoofers (for example, a simple repeater) can introduce time delay, and other GNSS spoofers can change time and position in arbitrary ways. In general, GNSS spoofing can change a GNSS receiver's estimate of position and time. For example, a 100 ns GPS time error introduced by spoofing give approximately a 30 m position error.

Recently, people have used spoofing devices to affect the integrity and accuracy of GNSS measurements. Spoofing devices imitate the transmission of GNSS signals from the GNSS satellites and sometimes transmit the imitation signals at a higher power than the signals broadcast by the GNSS satellites. When the navigation system receives the spoofed signals from the spoofing device, the navigation system may use the information in the spoofed signals instead of the information in the signals from the GNSS satellites. When a spoofing device has fooled the navigation system into using the spoofed signals instead of the actual GNSS signals, the spoofing device may provide misleading information to the navigation system. The misleading information may cause the navigation system to believe the GNSS satellites are at an alternate satellite position instead of the true satellite position. When the navigation system receives the misleading information, the navigation system may calculate a spoofed position that is significantly different (and potentially dangerous) from the desired estimated position.

In some examples, a device may first send signals to jam the reception of GNSS signals and then send spoofing signals that imitate the GNSS signals. For example, the device may attempt to jam the reception of GNSS signals such that the GNSS receiver cannot receive GNSS signals. After some time of transmitting the jamming signals, the device may send the spoofing signals that imitate the GNSS signals. As the GNSS receiver attempts to receive the GNSS signals, the GNSS receiver may receive the spoofed signals from the device instead of the actual GNSS signals from the GNSS satellites, and the navigation system may calculate a spoofed position that is significantly different (and potentially dangerous) from the desired estimated position.

The embodiments described herein provide systems and methods for detecting GNSS spoofing by using a chip-scale atomic clock. The GNSS clock is used to initialize the chip-scale atomic clock for a period of time, and the difference between GNSS time and the chip-scale atomic clock time is monitored and compared to a threshold that increases nonlinearly over time. If the difference between GNSS time and the chip-scale atomic clock time exceeds the threshold, then GNSS spoofing is determined to be occurring. In some examples, the threshold is modeled using known error parameters of the chip-scale atomic clock. When GNSS spoofing is detected, the navigation system and other systems onboard the vehicle are alerted and no longer use or trust GNSS.

Figure 1B:
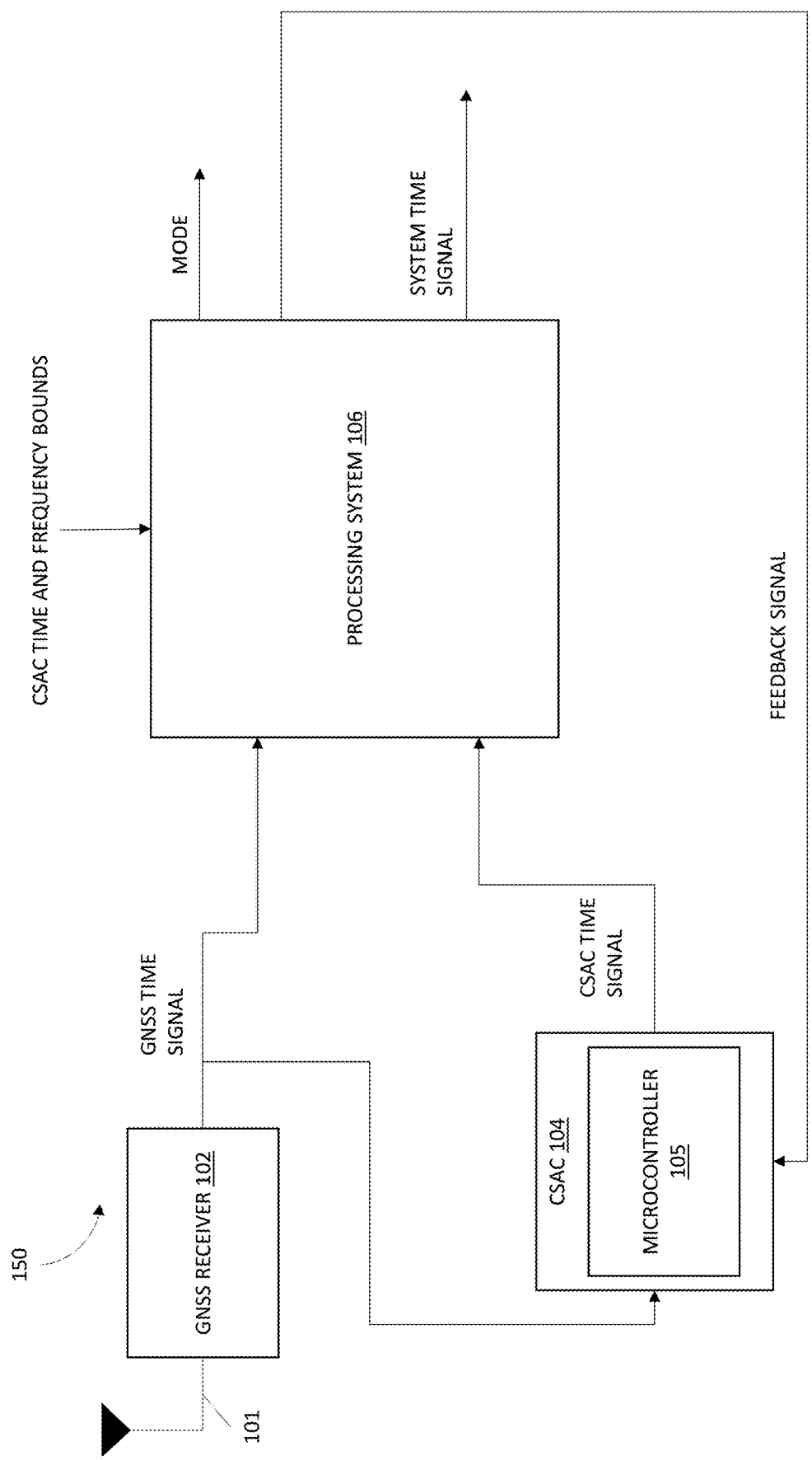

FIGS. 1A-1B illustrate block diagrams of example navigation systems 100, 150. In the examples shown in FIGS. 1A-1B, the navigation systems 100, 150 include a GNSS receiver 102, a chip-scale atomic clock 104, and a processing system 106. In the example shown in FIG. 1A, the navigation system 100 also includes a first summer 108 communicatively coupled to the GNSS receiver 102, the chip-scale atomic clock 104, and the processing system 106, and a second summer 110 communicatively coupled to the processing system 106 and the chip-scale atomic clock 104. It should be understood that the particular components and configuration of the components of the navigation systems 100, 150 can vary depending on requirements.

The GNSS receiver 102, and the navigation systems 100, 150 generally, may be mounted on or in a vehicle and configured to provide position and time information to the vehicle, for example an aircraft. Although an aircraft is referred to throughout the disclosure, this is merely for pedagogical reasons and not intended to be limiting in any sense. Instead, the term "vehicle" is intended to convey the ordinary meaning as understood by one having skill in the art, which includes, but not limited to, airborne vehicles, space vehicles, water borne ships, and other types of vehicles. In some examples, the navigation system 100, 150 may carried by a person, mounted on a trailer, or mounted on a projectile.

In the examples shown in FIGS. 1A-1B, the GNSS receiver 102 is communicatively coupled to the chip-scale atomic clock 104 and the processing system 106. The GNSS receiver 102 configured to be coupled to one or more antennas 101 configured to receive GNSS signals from satellites of one or more GNSS constellations (such as Global Positioning System (GPS), GLONASS, Galileo, BeiDou, etc.). The GNSS receiver 102 is configured to receive GNSS signals from the one or more antennas 101 and output a GNSS time signal to the processing system 106. In some examples, the GNSS time signal is derived from a pulse-per-second signal. In some examples, a FPGA or other processing device receives the pulse-per-second signal output by the GNSS receiver 102, time stamps the pulse-per-second signal, and outputs the time stamp to the processing system 106.

In the examples shown in FIGS. 1A-1B, the chip-scale atomic clock 104 is communicatively coupled to the GNSS receiver 102 and the processing system 106. The chip-scale atomic clock 104 is configured to output a chip-scale atomic clock time signal to the processing system 106. In some examples, the chip-scale atomic clock time signal is derived from a pulse-per-second signal. In some examples, an FPGA or other processing device receives the pulse-per-second signal output by the chip-scale atomic clock 104, time stamps the pulse-per-second signal, and outputs the time stamp to the processing system 106.

In some examples, the processing system 106 is configured to receive the GNSS time signal and the chip-scale atomic clock time signal from the GNSS receiver 102 and the chip-scale atomic clock 104. In the example shown in FIG. 1A, the GNSS time signal is differenced with the chip-scale atomic clock time signal prior to input into the processing system 106. In other examples, such as the example shown in FIG. 1B, the GNSS time signal is differenced with the chip-scale atomic clock time signal within the processing system 106. The processing system 106 is configured to utilize the GNSS time signal and the chip-scale atomic clock time signal to estimate and output a system time signal and/or error signals that are used by the navigation system 100 and other systems onboard the vehicle that rely on GNSS signals (for example, for determining time and/or position). In some examples, the system time signal is a pulse-per-second signal. In some examples, the processing system 106 implements a Kalman filter for estimating the system time signal and/or error signals.

In some examples, the processing system 106 is further configured to output a feedback signal to chip-scale atomic clock 104 in order to initialize the chip-scale atomic clock and/or to correct errors in the chip-scale atomic clock time signal. In some such examples, the processing system 106 is configured to determine the feedback signal based on the determined difference between the GNSS time signal and the chip-scale atomic clock time signal.

The processing system 106 is also configured to detect GNSS spoofing using the GNSS time signal and the chip-scale atomic clock time signal. In particular, the processing system 106 is configured to compare the GNSS time signal to the chip-scale atomic clock time signal to determine whether GNSS spoofing is occurring. When the difference between the GNSS time signal and the chip-scale atomic clock time exceeds a threshold that increases nonlinearly over time, then the processing system 106 determines that the GNSS receiver 102 is being spoofed. In some examples, the threshold is determined using the time and frequency bounds (for example, time and frequency drift) of the chip-scale atomic clock 104. The particular error parameters and models used to estimate the time and frequency error bounds of the chip-scale atomic clock 104 are discussed in more detail below.

In some examples, the determinations and estimates performed by the processing system 106 introduce a time delay (for example, a 1 second delay). In such examples, the processing system 106 is configured to compensate the system time signal to remove the time delay introduced by the processing system 106. For example, the processing system 106 is configured to subtract the time delay from the system time signal.

In some examples, the navigation system 100, 150 has three operational modes. The first mode of operation can generally be described as initialization of the chip-scale atomic clock 104. The second mode of operation can generally be described as normal operation with GNSS spoofing detection. The third mode of operation can generally be described as modified operation when GNSS spoofing is detected. In some examples, the navigation system 100, 150 is configured to output a signal indicative of the current mode of operation for the navigation system 100, 150.

In the first mode, it is assumed that the navigation system 100, 150 is starting from a location where GNSS spoofing is not being performed. While there is a chance that GNSS spoofing could occur at the starting location (for example, at a friendly airport), the likelihood of GNSS spoofing at the starting location is low and is not taken into account by the navigation system 100, 150. Since GNSS clocks are generally more accurate than a chip-scale atomic clock, the GNSS time signal can be considered truth at the start of operation for the navigation system 100, 150 and the GNSS time signal is used to calibrate/initialize the chip-scale atomic clock 104.

In some examples, during the first mode of operation, the GNSS time signal is provided to a microcontroller 105 of the chip-scale atomic clock 104 from the GNSS receiver 102, and the microcontroller 105 is configured to modify the output of the chip-scale atomic clock 104 in view of the GNSS time signal. In some examples, the GNSS time signal provided to the chip-scale atomic clock 104 includes information regarding the date, hour, minute, and fraction of a second.

In some examples, during the first mode of operation, the processing system 106 is configured to compare the GNSS time signal from the GNSS receiver 102 and the chip-scale atomic clock time signal from the chip-scale atomic clock 104. In such examples, the processing system 106 is configured to provide feedback to the chip-scale atomic clock 104. In some such examples, the processing system 106 is configured to provide the feedback signal to the microcontroller 105 of the chip-scale atomic clock 104, and the microcontroller 105 is configured to modify the output of the chip-scale atomic clock 104 in view of the feedback signal from the processing system 106 in addition to, or instead of, modifying the output of the chip-scale atomic clock 104 in view of the GNSS time signal from the GNSS receiver 102.

During the first mode of operation, the GNSS time signal is also used by the processing system 106 to estimate the system time signal, which is used for determining a navigation solution and output to other onboard systems that rely on GNSS signals for determining position and/or time. In examples where the GNSS time signal is differenced with the chip-scale atomic clock time signal outside the processing system 106 (for example, via a separate summation device 108 as shown in FIG. 1A), the chip-scale atomic clock time signal is added back into the system time signal (for example, via a separate summation device 110 as shown in FIG. 1A) because it was subtracted from the GNSS time signal prior to being input into the processing system 106. In examples where the GNSS time signal is differenced with the chip-scale atomic clock time signal within the processing system 106 (for example, as shown in FIG. 1B), the chip-scale atomic clock time signal is not added back into the system time signal because it was not subtracted from the GNSS time signal prior to being input into the processing system 106. In that case the chip-scale atomic clock signal is added back, inside the processing system 106, after the difference is run through a filter inside the processing system.

In some examples, the first mode of operation is performed for a predetermined amount of time (for example, 5-10 minutes) at the start of operation of the navigation system 100, 150 (for example, during and after takeoff). In some examples, the predetermined amount of time can be selected based on simulations that indicate an amount of time necessary to calibrate the chip-scale atomic clock 104 to an acceptable amount of error or several minutes after the time necessary for the chip-scale atomic clock 104 temperature to stabilize. In some examples, the first mode of operation is performed until the difference between the GNSS time signal and the chip-scale atomic clock time signal is below a predetermined threshold that corresponds to an acceptable amount of error for a chip-scale atomic clock. In some examples, the first mode of operation is performed for an amount of time indicated in a data sheet for the chip-scale atomic clock 104 from the manufacturer.

Once the initialization/calibration of the chip-scale atomic clock 104 is completed, the navigation system 100, 150 is configured to switch to the second mode of operation. During the second mode of operation, the calibrated chip-scale atomic clock 104 is configured to operate in an open loop manner such that the chip-scale atomic clock time signal is no longer influenced by the GNSS time signal from the GNSS receiver 102 or the feedback signal from the processing system 106. The chip-scale atomic clock 104 is configured to operate in an open loop manner in order to prevent the chip-scale atomic clock time signal from being corrupted by GNSS spoofing. In general, the chip-scale atomic clock 104 can operate in an open loop manner and within tolerable error bounds for a few hours. However, in some examples, the navigation system 100, 150 is configured to switch back to the first mode of operation when it is known that GNSS spoofing is not (or highly unlikely to be) occurring. For example, the navigation system 100 can switch to the first mode of operation after a specified time and when the navigation system is near a safe location (for example, in friendly airspace). Switching back to the first mode of operation is useful for reducing the error of the chip-scale atomic clock 104, which accumulates over time and can be reset to virtually zero via reinitialization.

During the second mode of operation, in some examples, the processing system 106 is configured to estimate the system time signal using the GNSS time signal from the GNSS receiver 102. In some examples, the chip-scale atomic clock time signal from the chip-scale atomic clock 104 is used in addition to the GNSS time signal. Since the GNSS time signal is generally more accurate than the chip-scale atomic clock time signal, in some examples, the processing system 106 is configured to weight the GNSS time signal significantly higher than the chip-scale atomic clock time signal when estimating the system time signal unless GNSS spoofing is detected. In some examples, the processing system 106 is configured to output the GNSS time signal as the system time signal unless GNSS spoofing is detected. In other examples, the processing system 106 is configured to output a Kalman-filtered output of the difference between the GNSS time signal and the chip-scale atomic clock time signal, and the system time is generated by adding the chip-scale atomic clock time signal to the Kalman-filtered output.

If GNSS is being spoofed, the GNSS time signal can be less accurate than the chip-scale atomic clock signal. Therefore, in some examples, the processing system 106 is configured to weight the GNSS time signal similarly as the chip-scale atomic clock time signal when estimating the system time signal to account for the possibility that GNSS spoofing could be present.

During the second mode of operation, the processing system 106 is configured to compare the GNSS time signal from the GNSS receiver 102 with the chip-scale atomic clock time signal from the chip-scale atomic clock 104 in order to detect whether GNSS spoofing is occurring. In particular, the processing system 106 is configured to determine a difference between the GNSS time signal and the chip-scale atomic clock time signal and compare the difference between the GNSS time signal and the chip-scale atomic clock time signal to a threshold that increases non-linearly over time. In some examples, the threshold is determined using the time and frequency bounds of the chip-scale atomic clock 104. In some examples, the time and frequency bounds of the chip-scale atomic clock 104 are input into the processing system 106, which determines the threshold for a particular moment in time. For example, the time and frequency bounds for the chip-scale atomic clock 104 can be input into the processing system 106 and the processing system 106 determines the maximum difference between the GNSS time signal and the chip-scale atomic clock time signal that can be attributed to the error of the chip-scale atomic clock 104. In some examples, the time and frequency bounds are provided in a data sheet for the chip-scale atomic clock 104 from the manufacturer. In some examples, the time and frequency bounds are determined based on a test of the chip-scale atomic clock 104 performance over a period of time. Since the time and frequency errors of the chip-scale atomic clock 104 accumulate over time in a nonlinear manner until the chip-scale atomic clock is reinitialized, the threshold increases nonlinearly with time.

When the difference between the GNSS time signal and the chip-scale atomic clock time signal does not exceed the threshold, the processing system 106 continues to utilize the GNSS time signal in the manner discussed above. However, when the difference between the GNSS time signal and the chip-scale atomic clock time signal does exceed the threshold, the navigation system 100 switches to the third mode of operation.

In the third mode of operation, the processing system 106 and other systems onboard the vehicle no longer use the GNSS time signal from the GNSS receiver 102 or trust GNSS because GNSS spoofing has been detected. The processing system 106 is configured to utilize only the chip-scale atomic clock time signal for estimating the system time signal.

In some examples, the processing system 106 is configured to switch over to outputting the chip-scale atomic clock time signal with the maximum error bounds as the system time signal after detecting that GNSS spoofing is occurring. However, this approach could lead to undesirable jumps in the system time signal estimation if the GNSS spoofing influenced the system time signal estimate to diverge from the chip-scale atomic clock time signal.

To avoid potential undesirable jumps in the system time signal, in other examples, the processing system 106 is configured to output a system time signal that aligns with the time and frequency error bound for the chip-scale atomic clock 104 that was crossed when GNSS spoofing was detected. In some such examples, the processing system 106 is configured to smoothly adjust the system time signal to align the system time signal with the chip-scale atomic clock time signal over time in order to avoid the undesirable jump in the system time signal. For example, the processing system 106 can be configured to step the system time signal each second by a small amount corresponding to a portion of the difference between the current system time signal and the current chip-scale atomic clock time signal. In other such examples, the processing system 106 is configured to align the system time signal with the time and frequency error bound for the chip-scale atomic clock 104 that was crossed while operating in the third mode.

In some examples, the processing system 106 is configured to switch back to the second mode of operation when the difference between the GNSS time signal and the chip-scale atomic clock time signal drops below the threshold. In some such examples, the processing system 106 is configured to smoothly adjust the system time signal to align with the GNSS time signal more closely over time in order to avoid the undesirable jump in the system time signal in a similar manner to that discussed above.

Figure 2:
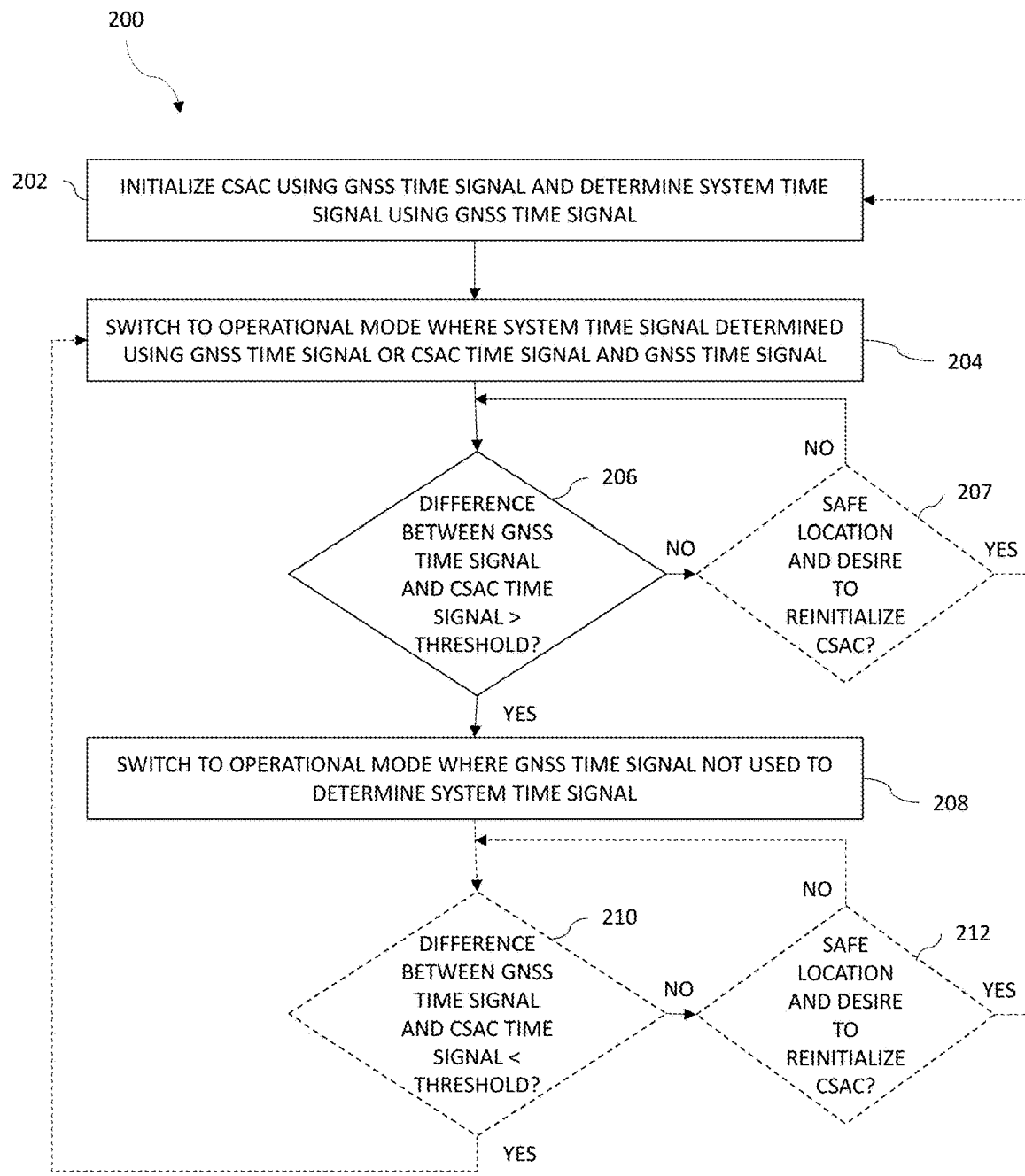
FIG. 2 is a flow diagram of an example method of detecting GNSS spoofing.

FIG. 2 is an example method 200 of detecting GNSS spoofing and operating a navigation system. The common features discussed above with respect to navigation systems 100, 150 in FIGS. 1A-1B can include similar characteristics to those discussed with respect to method 200 and vice versa. In some examples, method 200 can be performed by the navigation systems 100, 150.

The method 200 includes initializing the chip-scale atomic clock using the GNSS time signal and determining the system time signal using the GNSS time signal (block 202). In some examples, the chip-scale atomic clock receives the GNSS time signal from the GNSS receiver and modifies the chip-scale atomic clock time signal based on the GNSS time signal. In some examples, the chip-scale atomic clock modifies the chip-scale atomic clock time signal based on a feedback signal from a processing system that indicates a difference between the GNSS time signal and the chip-scale atomic clock time signal. In some examples, the chip-scale atomic clock is initialized using both the GNSS time signal from the GNSS receiver and the feedback signal from the processing system.

During initialization of the chip-scale atomic clock, the system time signal, which is output by a processing system and used to determine a navigation solution, is determined using the GNSS time signal. In some examples, the processing system implements a Kalman filter or other type of filter to model and remove noise in order to output a more accurate estimate for the system time signal. When the chip-scale atomic clock is being initialized, the chip-scale atomic clock time signal from the chip-scale atomic clock is not used for determining the system time signal.

When initialization of the chip-scale atomic clock is complete, the method proceeds with switching to an operational mode where the system time signal is determined using the GNSS time signal or the chip-scale atomic clock time signal and the GNSS time signal (block 204). In some examples, the processing system used to determine the system time signal applies a higher weight to the GNSS time signal than the chip-scale atomic clock signal due to the generally superior accuracy of the GNSS time signal compared to the chip-scale atomic clock time signal. In some examples, the GNSS time signal is approximately two orders of magnitude more accurate than the chip-scale atomic clock time signal, so the GNSS time signal accounts for most or all of the influence on the system time signal. In other examples, the system time signal corresponds to the GNSS time signal during the second mode of operation.

During the second mode of operation, the method 200 further includes determining whether a difference between the GNSS time signal and the chip-scale atomic clock time signal exceeds a threshold that increases nonlinearly over time (block 206). In some examples, the difference between the GNSS time signal and the chip-scale atomic clock time signal is determined using a summer outside of the processing system of a navigation system. In other examples, the difference between the GNSS time signal and the chip-scale atomic clock time signal is determined using the processing system of the navigation system.

In some examples, the threshold corresponds to the accumulated time and frequency error bounds of the chip-scale atomic clock, which increases nonlinearly over time unless the chip-scale atomic clock is reinitialized. There are a number of ways that the system time signal and the time and frequency error bounds of the chip-scale atomic clock can be determined (modeled), which affects the performance of the navigation system in detecting GNSS spoofing. An example is discussed below with respect to FIGS. 4-6.

When it is determined that the difference between the GNSS time signal and the chip-scale atomic clock time signal does not exceed the threshold, the method 200 proceeds with repeating the determination in block 206 in order to continue monitoring for GNSS spoofing. In some examples, the method 200 optionally proceeds with determining whether the navigation system is in a safe location (for example, in friendly airspace) and whether a reinitialization of the chip-scale atomic clock is desired or needed (for example, after a predetermined operation time (for example, one hour) for the chip-scale atomic clock after being initialized) (block 207). In such examples, when the navigation system is in a safe location and reinitialization is needed or desired, the method 200 proceeds to block 202 and initializes the chip-scale atomic clock using the GNSS time signal and/or the feedback signal from the processing system.

When it is determined that the difference between the GNSS time signal and the chip-scale atomic clock time signal does exceed the threshold, the method 200 proceeds with switching the navigation system to a third operation mode where the GNSS time signal is not used to determine the system time signal (block 208). In some examples, the processing system outputs the chip-scale atomic clock time signal with the maximum error bounds as the system time signal during the third mode of operation. In other examples, the processing system outputs a system time signal that aligns with the time and frequency error bound for the chip-scale atomic clock that was crossed when GNSS spoofing was detected. In some such examples, the processing system smoothly adjusts the system time signal to align with the chip-scale atomic clock time signal over time in order to avoid the undesirable jump in the system time signal. For example, the processing system can step the system time signal each second by a small amount corresponding to the difference between the current system time signal and the current chip-scale atomic clock time signal. In other such examples, the processing system aligns the system time signal with the time and frequency error bound for the chip-scale atomic clock that was crossed while operating in the third mode.

In some examples, the method 200 includes the navigation system operating in the third mode for the remainder of the mission if GNSS spoofing is detected. In other examples, the method 200 optionally proceeds with determining whether the difference between the GNSS time signal and the chip-scale atomic clock time signal no longer exceeds the threshold (block 210). In such examples, when the difference between the GNSS time signal and the chip-scale atomic clock time signal still exceeds the threshold, the method 200 repeats block 210. In some examples, the method 200 optionally proceeds with determining whether the navigation system is in a safe location (for example, in friendly airspace) and whether a reinitialization of the chip-scale atomic clock is desired or needed (for example, after a predetermined operation time (for example, one hour) for the chip-scale atomic clock after being initialized) (block 212). In such examples, when the navigation system is in a safe location and reinitialization is needed or desired, the method 200 proceeds to block 202 and initializes the chip-scale atomic clock using the GNSS time signal and/or the feedback signal from the processing system.

When the difference between the GNSS time signal and the chip-scale atomic clock time signal no longer exceeds the threshold, the method 200 optionally proceeds to block 204 and switches to the second operational mode.

By utilizing the systems and method described above, a navigation system can reliably detect GNSS spoofing and prevent corrupted GNSS signals from being used for navigation.

The accuracy and reliability of the GNSS spoofing detection is affected by the accuracy of the model of the errors of the chip-scale atomic clock 104. There are a number of types of noise that contribute to the time and frequency errors of a chip-scale atomic clock. For example, chip-scale atomic clock errors are a combination of phase bias, frequency bias, white noise, random walk, and flicker noise. The stability of a chip-scale atomic clock can be measured and modeled using the Allan Variance. Given any time-domain signal x(iT), i=1, 2, . . . , n, fractional frequency is defined by $$y_i(\tau) = \frac{x(iT+\tau) - x(iT)}{\tau}$$

and then the Allan Variance is: $\sigma_y^2(\tau) = \frac{1}{2} \Sigma_{i=1}^{n-1} y_{i+1}(\tau) - y_i(\tau))^2$.

Figure 3:
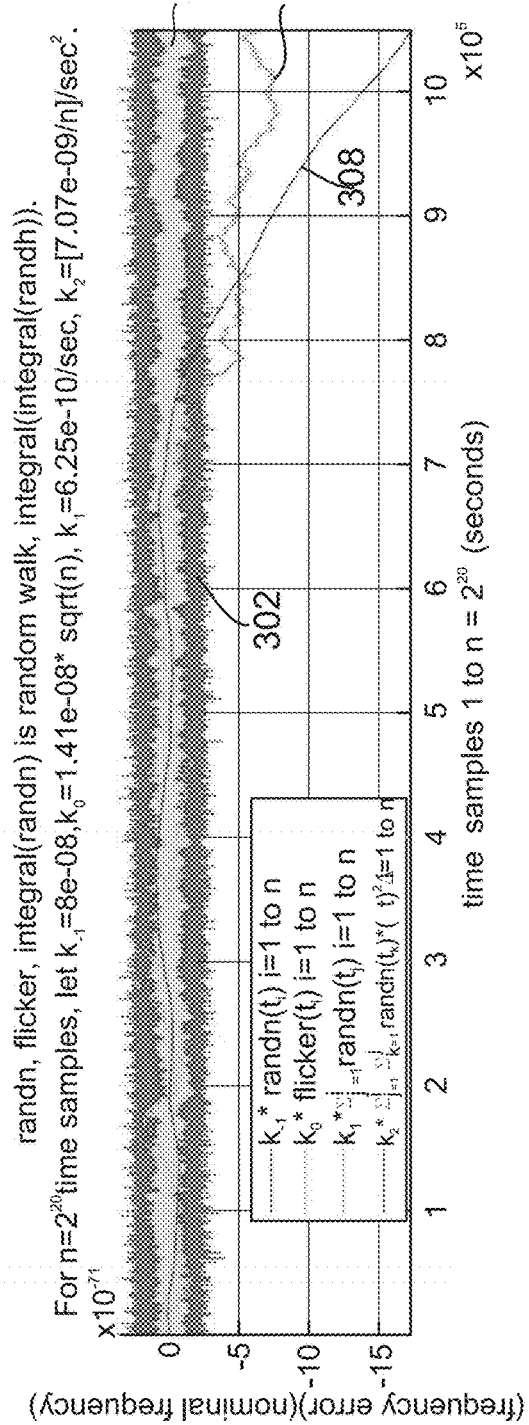
FIG. 3 illustrates signals used to model error for a chip-scale atomic clock and Allan Variances.
Figure 3:
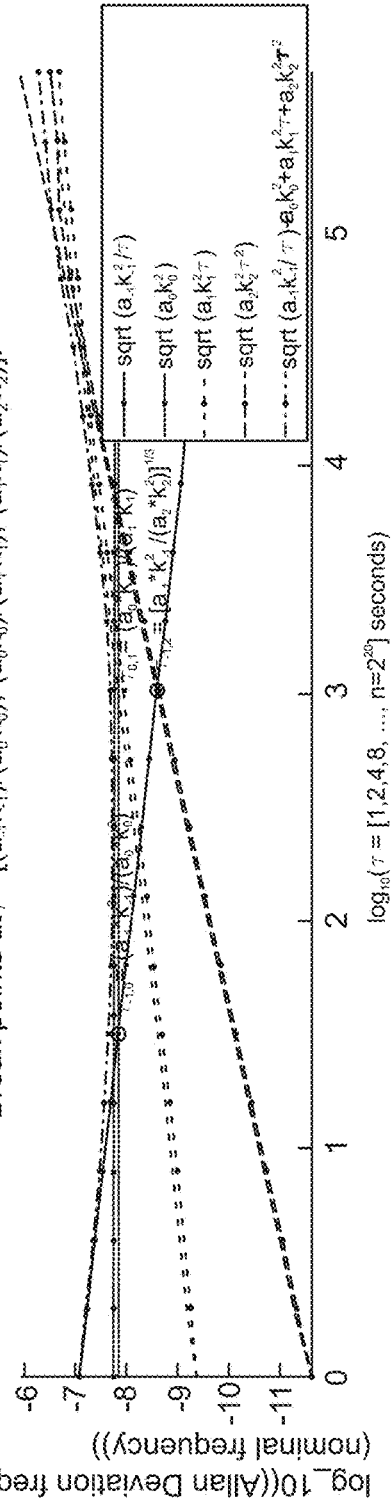

For a chip-scale atomic clock, four signals, which are plotted on the top graph of FIG. 3, can be used to make a fairly accurate approximation of the chip-scale atomic clock error. In particular, the signals shown in FIG. 3 and their Allan Variances are:

$x(iT)=k_{-1}\text{randn}(iT)$, $\sigma_y^2(\tau)=\alpha_{-1}k_{-1}^2/\tau$ $x(iT)=k_0\text{flicker}(iT)$, $\sigma_y^2(\tau)=\alpha_0 k_0^2$ $x(iT)=k_1\Sigma_{j=1}^i \text{randn}(jT)(\Delta t)$, $\sigma_y^2(\tau)=\alpha_1 k_1^2 \tau$ $x(iT)=k_2\Sigma_{j=1}^i \Sigma_{k=1}^j \text{randn}(kT)(\Delta t)^2$, $\sigma_y^2(\tau)=\alpha_2 k_2^2 \tau^2$ Coefficients $\alpha_{-1}$, $\alpha_0$, $\alpha_1$, $\alpha_2$ come from the summations that define Allan Variance, while coefficients $k_{-1}$, $k_0$, $k_1$, $k_2$ on the time signals, get squared in Allan Variance of those signals. The first signal, which is represented by line 302 in the top graph of FIG. 3, is an approximation of white noise. The second signal, which is represented by line 304 in the top graph of FIG. 3, is an approximation of flicker noise. The third signal, which is represented by line 306 in the top graph of FIG. 3, is an approximation of random walk, which is the sum of white noise. The fourth signal, which is represented by line 308 in the top graph of FIG. 3, is a double sum of white noise.

The bottom graph of FIG. 3 illustrates the Allan deviation of each of the four signals shown in the top graph of FIG. 3. Allan variance of each individual signal is of the form $\sigma_y^2(\tau)=\alpha_m k_m^2 \tau^m$, so each are represented by a line in the log-log plot on the bottom graph of FIG. 3. Times $$\tau_{m,m+1} = \frac{a_m k_m^2}{a_{m+1} k_{m+1}^2}$$

are defined to be the averaging time $\tau$ where line $\alpha_m k_m^2 \tau^{m^t}$ and line $\alpha_{m+1} k_{m+1}^2 \tau^{m+1}$ intersect. The Allan Variance coefficients are defined in Table 1 below.

TABLE 1

| $k_m \ x_m(i)$ with $i = 1$ to n samples | 2-sample Allan Variance is $\alpha_m k_m^2 \tau^m$ | $\alpha_m$ | $k_{m+1} = k_m \sqrt{\dfrac{a_m}{a_{m+1}} \dfrac{1}{\tau_{m,m+1}}}$ | $\tau_{m,m+1} = \dfrac{a_m k_m^2}{a_{m+1} k_{m+1}^2}$ |
|---|---|---|---|---|
| $k_{-1}$ randn(i) | $\alpha_{-1} k_{-1}^2 \tau^{-1}$ | $\alpha_{-1} = 1$ sec | $k_{-1}$ | $\tau_{-1,0} = \dfrac{a_{-1} k_{-1}^2}{a_0 k_0^2}$ sec |
| $k_0$ flicker(i) | $\alpha_0 k_0^2$ | $a_0 = \dfrac{1}{n}$ | $k_0 = k_{-1}\sqrt{\dfrac{a_{-1}}{a_0}\dfrac{1}{\tau_{-1,0}}}$ | $\tau_{0,1} = \dfrac{a_0 k_0^2}{a_1 k_1^2}$ sec |
| $k_1 \Sigma_{j=1}^i$ randn(j) $\Delta t$ | $\alpha_1 k_1^2 \tau$ | $a_1 = \dfrac{1}{2}$ sec | $k_1 = k_0 \sqrt{\dfrac{a_0}{a_1}\dfrac{1}{\tau_{0,1}}}$ /sec | $\tau_{1,2} = \dfrac{a_1 k_1^2}{a_2 k_2^2}$ sec |
| $k_2 \Sigma_{j=1}^i \Sigma_{k=1}^j$ randn(k) $(\Delta t)^2$ | $\alpha_2 k_2^2 \tau^2$ | $a_2 = \dfrac{n}{8}$ sec$^2$ | $k_2 = k_1 \sqrt{\dfrac{a_1}{a_2}\dfrac{1}{\tau_{1,2}}}$ /sec$^2$ | N.A. |

In addition to the Allan deviations of the four signals, the bottom graph of FIG. 3 also shows the Allan deviation of the sum of the four signals:

$x(iT)=k_{-1}\text{randn}(iT)+k_0\text{flicker}(iT)+k_1\Sigma_{j=1}^i\text{randn}(jT)$
$(\Delta t)+k_2\Sigma_{j=1}^i\Sigma_{k=1}^j\text{randn}(kT)(\Delta t)^2$ An example of simulated performance of the navigation system 100, 150 where the processing system 106 implements a Kalman filter with a more complex modeling of the chip-scale atomic clock is discussed below with respect to FIGS. 4-6.

Figure 4:
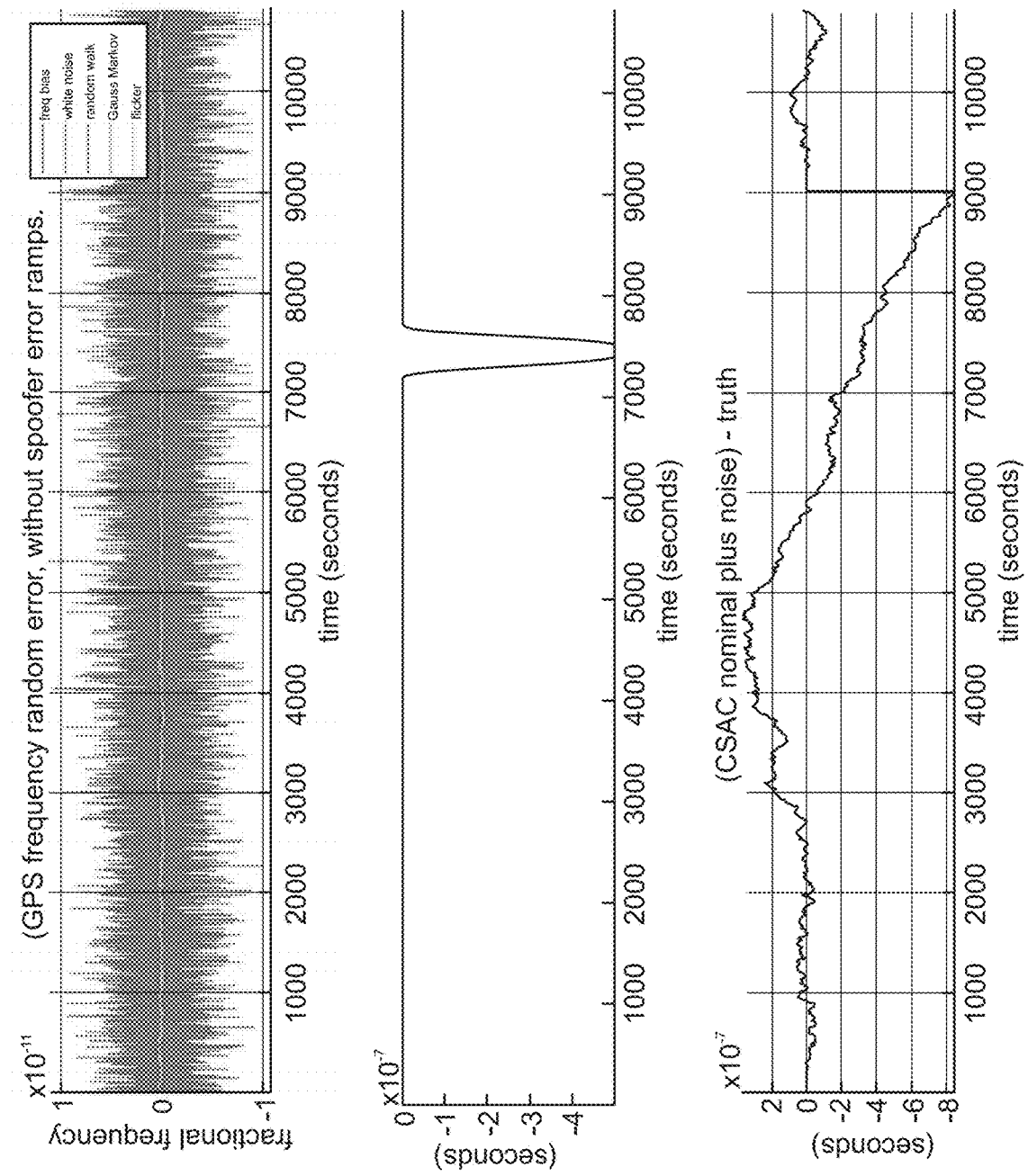
FIGS. 4-6 illustrate example parameters and simulation data for operation of an example navigation system.
Figure 5:
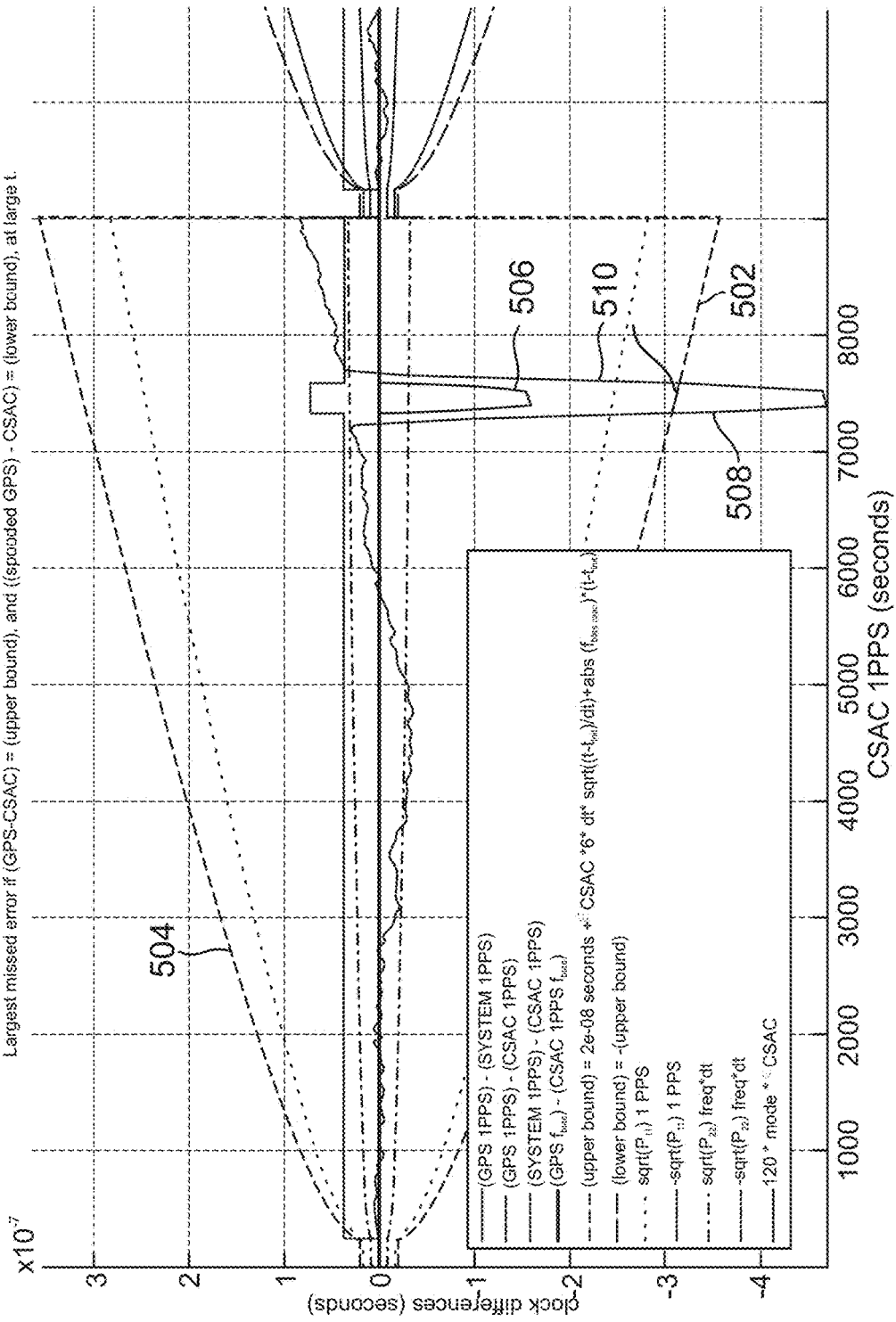
Figure 6:
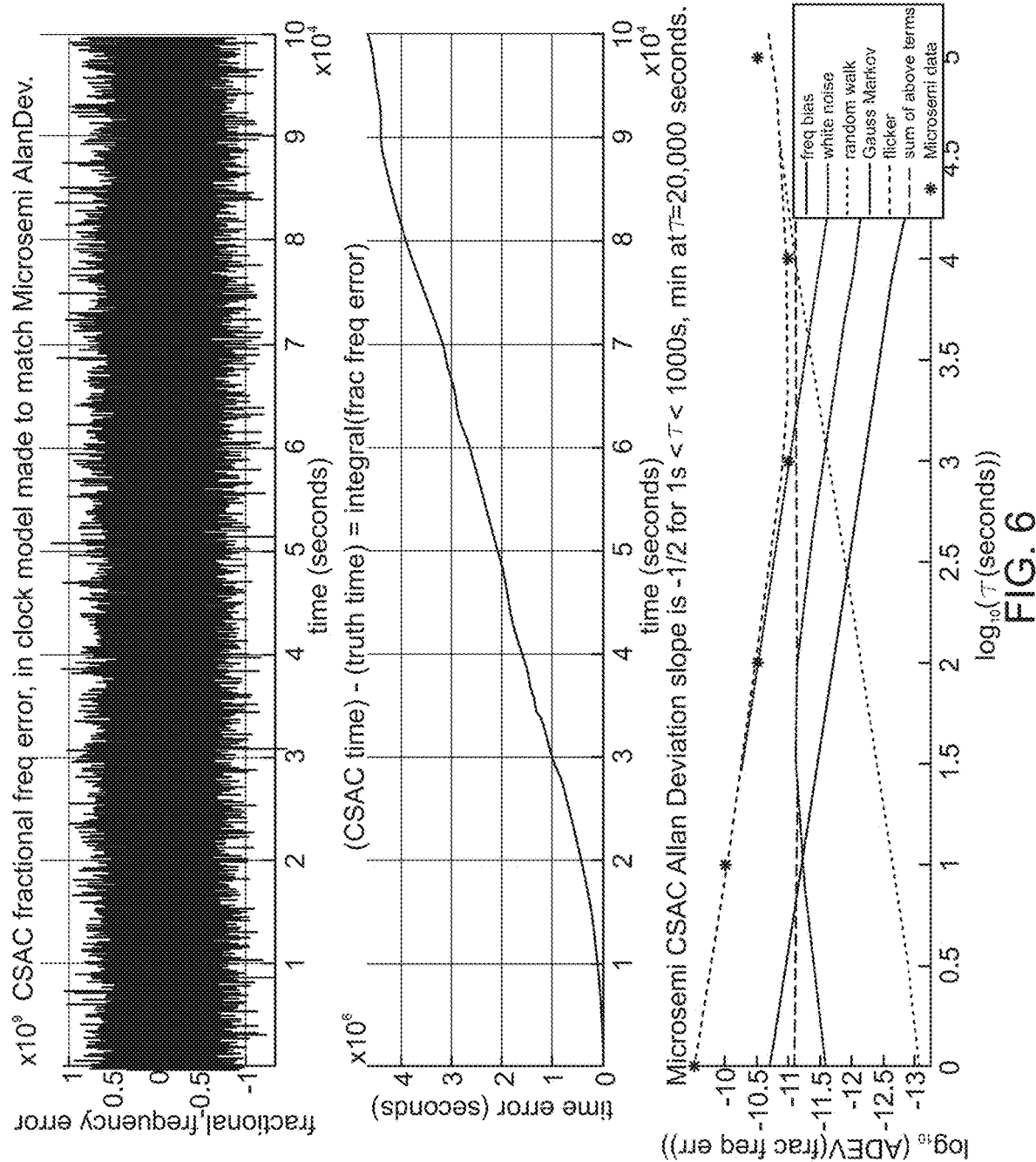

In the example shown in FIGS. 4-6, the processing system is configured to implement a clock model with six states, time phase $\varphi$ and five frequency error states: $f_{bias}$, $f_{white}$, $f_{random\_walk}$, $f_{Gauss\_Markov}$, $f_{flicker}$. The chip-scale atomic clock fractional error Allan Deviation is $$\varepsilon = \frac{(\Delta f)}{f} \approx 3 * 10^{-10}$$

at an averaging time of $\tau_{AD}=1$ second. Clock models use $\tau_{RW}=2500$ seconds, which is the averaging time where Allan Variance stops going down and $\tau_{GM}=25$ seconds for the Gauss-Markov process that is too small to see in Allan deviation plot discussed below. The Kalman filter is configured to reject the GNSS time measurement (also referred to as GPS 1PPS for this example) if the difference between the GNSS time measurement and the chip-scale atomic clock time measurement (also referred to as CSAC 1PPS for this example) is greater than the error bounds of the chip-scale atomic clock. In some examples, the bounds include a term linear in time and a term proportional to sqrt(time). In some examples, a constant term is also be added to the bounds that includes a term linear in time and a term proportional to sqrt(time).

In this example, the Kalman filter for time error can be expressed as $\varphi_{err} = \varphi_{GPS} - \varphi_{CSAC}$, where $\varphi_{GPS}$ is GPS time signal and $\varphi_{sAc}$ is CSAC time signal. Dynamics $x_{i+1} = Fx_i + Gw_i$, $y_i = Hx_i + v_i$, $Q = \text{cov}(w)$, $R = \text{cov}(v)$.

$$x = \begin{bmatrix} \varphi_{err} \\ (\Delta t) f_{err} \end{bmatrix}, F = \begin{bmatrix} 1 & 1 \\ 0 & 1 \end{bmatrix}, G = \begin{bmatrix} 1 & 0 \\ 0 & 1 \end{bmatrix},$$

$$H = [1 \ 0], \Delta t = 1s, \varepsilon = 3*10^{-10}$$

The bounds for detecting GNSS spoofing grow with time since atomic clocks are unstable. The fractional frequency error after sampling 1 second is $\varepsilon = 3*10^{-10}$. The time and frequency error bounds of the chip-scale atomic clock are given by:

$$b_\varphi(t) = c_0 + c_1(\Delta t)\sqrt{\frac{t - t_{init}}{\Delta t}} + c_2(t - t_{init}),$$

$$c_0 = 20 \text{ ns}, c_1 = 6 \ \varepsilon, c_2 = \varepsilon \sqrt{\frac{\Delta t}{t_{init\_duration}}},$$

$$b_f(t) = \frac{d}{dt} b_\varphi(t) = \frac{c_1}{2} \sqrt{\frac{\Delta t}{t - t_{init}}} + c_2.$$

These bounds determine covariances:

$$Q(t) = \begin{bmatrix} b_\varphi(t) & 0 \\ 0 & b_f(t) \end{bmatrix}^2, R(t) = (b_\varphi(t))^2,$$

$$P(t) \approx \begin{bmatrix} b_\varphi(t) & 0 \\ 0 & b_f(t) \end{bmatrix} \begin{bmatrix} 4.6 & 2.4 \\ 2.4 & 3.0 \end{bmatrix} \begin{bmatrix} b_\varphi(t) & 0 \\ 0 & b_f(t) \end{bmatrix}$$

this approximation of P(t) is computed from F, G, H, Q, R using an algebraic Riccati equation, $$\begin{bmatrix} \varphi_{err}(t) \\ (\Delta t) f_{err}(t) \end{bmatrix}^T [P(t)]^{-1} \begin{bmatrix} \varphi_{err}(t) \\ (\Delta t) f_{err}(t) \end{bmatrix} < 3^2 \text{ for 3-sigma error bound.}$$

In this example, the system GPS and CSAC clock models can be expressed with:

$$x_{i+1} = Fx_i + Gw_i, i = 1 \text{ to } n,$$

$$F = \begin{bmatrix} 1 & \Delta t & \Delta t & \Delta t & \Delta t & \Delta t \\ 0 & 0 & 0 & 0 & 0 & 0 \\ 0 & 0 & 0 & 0 & 0 & 0 \\ 0 & 0 & 0 & 1 & 0 & 0 \\ 0 & 0 & 0 & 0 & 1 - \frac{\Delta t}{\tau_{GM}} & 0 \\ 0 & 0 & 0 & 0 & 0 & 0 \end{bmatrix},$$

$$x = \begin{bmatrix} \varphi \\ f_{bias} \\ f_{white} \\ f_{Random\_Walk} \\ f_{Gauss\_Markov} \\ f_{flicker} \end{bmatrix}, \Delta t = 1 \text{ s}, G = \begin{bmatrix} \Delta t & 0 & 0 & 0 & 0 & 0 \\ 0 & \varepsilon_1 & 0 & 0 & 0 & 0 \\ 0 & 0 & \varepsilon_2 & 0 & 0 & 0 \\ 0 & 0 & 0 & \varepsilon_3 \frac{\Delta t}{\tau_{RW}} & 0 & 0 \\ 0 & 0 & 0 & 0 & \varepsilon_4 \frac{\Delta t}{\tau_{GM}} & 0 \\ 0 & 0 & 0 & 0 & 0 & \varepsilon_5 \end{bmatrix},$$

$$w = \begin{bmatrix} f_{nominal} \\ \text{white noise} \\ \text{white noise} \\ \text{white noise} \\ \text{white noise} \\ \frac{\sqrt{n}}{8} \text{flicker} \end{bmatrix}, \text{ and } \begin{bmatrix} \varepsilon_1 \\ \varepsilon_2 \\ \varepsilon_3 \\ \varepsilon_4 \\ \varepsilon_5 \end{bmatrix} = \begin{bmatrix} \sqrt{(\Delta t)/t_{init\_duration}} \\ 1.0 \\ 1.0 \\ 0.3 \\ 0.17 \end{bmatrix} \varepsilon.$$

For CSAC, $\varepsilon = 3*10^{-10}$. GPS is 100 times better than CSAC, so for GPS, $\varepsilon = 3*10^{-12}$. The value of $\varepsilon$ used in $b_\varphi(t)$ above is CSAC $\varepsilon = 3*10^{-10}$ because CSAC errors dominate GPS errors.

F and G represent models of how the chip-scale atomic clock works, and w represents different types of noise. Flicker noise, flicker($t_i$), i=1 to n, has a constant Allan Variance. and is the Inverse Fast Fourier Transform of $$\text{FLICKER}(f_k) = \frac{\exp(\sqrt{-1} \ rand_k)}{\sqrt{f_k}}.$$

This parameter has random phase, and magnitude $$\frac{1}{\sqrt{f_k}},$$

where real flicker($t_i$) requires discrete frequencies $f_k$ to be left-right symmetric:

$$f_k = \left\{ \frac{1}{n}, \frac{2}{n}, \frac{3}{n}, \dots \frac{1}{2} - \frac{1}{n}, \frac{1}{2}, \frac{1}{2} - \frac{1}{n}, \dots \frac{3}{n}, \frac{2}{n}, \frac{1}{n} \right\}.$$

Flicker noise is generally used in GNSS clocks and chip-scale atomic clocks, but it is too small to affect Q and R in the Kalman filter. In some examples, the time-domain flicker noise is generated using Matlab code.

FIG. 4 illustrates example parameters used to simulate operation of the navigation system and particularly the processing system 106 implementing the alternative Kalman filter, clock model, and threshold that increases nonlinearly over time (for example, includes a linear term and a sqrt (time) term) based on the parameters discussed above. FIG. 4 refers particularly to GPS, but it should be understood that the Kalman filter could also be used for other GNSS constellations.

FIG. 4 illustrates a GPS frequency random error graph, a GPS time error graph when affected by spoofing, and chip-scale atomic clock errors (including multiple initializations and normal operation). As can be seen in FIG. 4, the GPS errors are several orders of magnitude smaller than the chip-scale atomic clock errors when the chip-scale atomic clock is not being initialized. The integral of the chip-scale atomic clock frequency errors provides the chip-scale atomic clock time errors shown in the bottom plot of FIG. 4. The time errors for the chip-scale atomic clock will cause the time estimate and position estimate to drift away from GPS when using the chip-scale atomic clock. The example shown in FIG. 4 includes no GPS spoofing error introduced for the first two hours (7200 seconds) of operation. However, after two hours, a smooth GPS error is provided, which causes the GPS frequency to go to −500 ns and then return to normal after 500 seconds. This type of GPS spoofing signal could be provided with enough power to overwhelm the actual GPS signals at the GNSS receiver. As shown in FIG. 4, the GPS spoofing signal introduces an error of approximately 500 ns, which is likely to go undetected by a GNSS receiver.

FIG. 5 illustrates an example simulation of the operation of the navigation system 100, 150 using the signals shown in FIG. 4 and the alternative Kalman filter discussed above. The dashed lines 502, 504 represent the time error bounds of the chip-scale atomic clock. Since the true time is generally not known during operation, the graph illustrated in FIG. 5 includes differences between the system time signal (SYSTEM 1PPS), the GNSS time signal (GPS 1PPS), and the chip-scale atomic clock time signal (CSAC 1PPS). The solid line 506 represents the difference between the GNSS time signal and the system time signal. The dashed line 508 represents the difference between the GNSS time signal and the chip-scale atomic clock time signal. The dashed line 510 represents the difference between the system time signal and the chip-scale atomic clock signal.

As can be seen in FIG. 5, the chip-scale atomic clock is initialized during the first approximately 240 seconds and again from 9000-9240 seconds, which could occur when the navigation system is in a safe location. At approximately two hours (7200 seconds), the GNSS spoofing signal is applied to the GNSS time signal and the error on the GNSS signal increases, which is shown by the increase in the difference between the GNSS time signal and the chip-scale atomic clock time signal and system time signal. When the difference between the GNSS time signal and the chip-scale atomic clock time signal is outside the time error bounds represented by the line 502, the navigation system switches to the third mode of operation and the GNSS time signal is not used and the system time signal follows the error bounds of the chip-scale atomic clock that was crossed. In the example shown in FIG. 5, this is shown where the dashed line 508 (representing the difference between the GNSS time signal and the chip-scale atomic clock time signal) dips temporarily below the dashed line 502 (representing the threshold), and the dashed line 510 (representing the difference between the system time signal and the chip-scale atomic clock time signal) follows dashed line 502 rather than also dipping below dashed line 502.

In the example shown in FIG. 5, the navigation system switches back to the second mode of operation, where the GNSS time signal is used to estimate the system time signal, when the difference between the GNSS time signal and the chip-scale atomic clock time signal is within the time error bounds for the chip-scale atomic clock (at approximately 7700 seconds). In the example shown in FIG. 5, this is shown where the dashed line 508 (representing the difference between the GNSS time signal and the chip-scale atomic clock time signal) rises above the dashed line 502 (representing the threshold), and the dashed line 510 (representing the difference between the system time signal and the chip-scale atomic clock time signal) follows dashed line 508 when it rises above the dashed line 508.

FIG. 6 illustrates data produce using the model in the top graph and a comparison of the Allan deviation derived from the model data with the test data from a chip-scale atomic clock data sheet. The asterisk points represent the test data from the chip-scale atomic clock data sheet. By adjusting the k-coefficients or c-coefficients of the model, the match between the Allan deviation of the model data and the test data can be improved.

The example Kalman filters described above were able to detect GNSS spoofing reliably. The example described with respect to FIGS. 4-6 performed better than other examples due to using a more sophisticated Kalman filter, a more accurate model of the chip-scale atomic clock, and chip-scale atomic clock time and frequency error bounds that increase nonlinearly over time (for example, represented by a linear-in-time term and a sqrt(time) term). When using $c_0=20$ ns for the example described with respect to FIGS. 4-6, there were no missed detections and a single false alarm over 10,000 Monte Carlo runs comparing time errors (GPS−CSAC) with plus or minus bound $c_0+c_1(\Delta t)\sqrt{(t-t_{init})/(\Delta t)}+c_2(t-t_{init})$. Each run had different initializations of the random number generators used to construct the noise terms. A missed detection is when GPS error was not detected and the mode did not switch, and a false alarm is when the mode switched while the GPS error was not present.

In various aspects, system elements, method steps, or examples described throughout this disclosure (such as the navigation systems 100, 150, the processing system 106, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used in a navigation system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media, which are provided by communication networks, wired, and/or wireless.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a system, comprising: a Global Navigation Satellite System (GNSS) receiver communicatively coupled to an antenna, wherein the GNSS receiver is configured to receive GNSS signals from GNSS satellites via the antenna, wherein the GNSS receiver is configured to output a GNSS time signal; a chip-scale atomic clock configured to output a chip-scale atomic clock time signal; at least one processor coupled to a memory, wherein the at least one processor is communicatively coupled to the GNSS receiver and the chip-scale atomic clock, wherein the at least one processor is configured to: determine whether a difference between the GNSS time signal and the chip-scale atomic clock time signal exceeds a threshold that increases nonlinearly over time until the chip-scale atomic clock is reinitialized; when the difference between the GNSS time signal and the chip-scale atomic clock time signal does not exceed the threshold, estimate a system time signal using the GNSS time signal or the GNSS time signal and the chip-scale atomic clock time signal; when the difference between the GNSS time signal and the chip-scale atomic clock time signal exceeds the threshold, estimate a system time signal without using the GNSS time signal and output an alarm indicating that GNSS spoofing has been detected; and output the system time signal or a signal indicative of a system time error signal.

Example 2 includes the system of Example 1, wherein the at least one processor is further configured to provide a feedback signal to the chip-scale atomic clock based on the determined difference between the GNSS time signal and the chip-scale atomic clock time signal.

Example 3 includes the system of any of Examples 1-2, wherein the chip-scale atomic clock includes a microcontroller, wherein the microcontroller is configured to initialize the chip-scale atomic clock by modifying the chip-scale atomic clock time signal based on the GNSS time signal from the GNSS receiver and/or a feedback signal from the at least one processor.

Example 4 includes the system of any of Examples 1-3, further comprising: a first summer communicatively coupled to the GNSS receiver and the chip-scale atomic clock, wherein the first summer is configured to: receive the GNSS time signal from the GNSS receiver and the chip-scale atomic clock time signal from the chip-scale atomic clock; determine a difference between the GNSS time signal and the chip-scale atomic clock; and output the difference between the GNSS time signal and the chip-scale atomic clock to the at least one processor.

Example 5 includes the system of Example 4, further comprising: a second summer communicatively coupled to the at least one processor and the chip-scale atomic clock, wherein the second summer is configured to: receive the chip-scale atomic clock time signal from the chip-scale atomic clock; receive the signal indicative of the system time error signal; add the chip-scale atomic clock time signal to the signal indicative of the system time error signal to generate the system time signal; and output the system time signal.

Example 6 includes the system of any of Examples 1-5, wherein the at least one processor is configured to output the system time signal.

Example 7 includes the system of any of Examples 1-6, wherein the at least one processor is further configured to: receive time and frequency bounds for the chip-scale atomic clock; model time and frequency error bounds for the chip-scale atomic clock over time based on the received time and frequency bounds for the chip-scale atomic clock; and set the threshold to correspond to the modeled time and frequency error bounds for the chip-scale atomic clock over time.

Example 8 includes the system of Example 7, wherein the at least one processor is configured to model the time and frequency error bounds for the chip-scale atomic clock using an Allan variance of one or more of bias, white noise, random walk, Gauss Markov, and flicker noise.

Example 9 includes the system of any of Examples 1-8, wherein the system is configured to be mounted on or in a vehicle, carried by a person, mounted on a trailer, or mounted on a projectile.

Example 10 includes the system of Example 9, further comprising one or more additional onboard systems, wherein the at least one processor is configured to output the alarm indicating the GNSS spoofing has been detected to the one or more additional onboard systems.

Example 11 includes the system of any of Examples 1-10, wherein the at least one processor is configured to estimate the system time error signal as being equal to a maximum error for the chip-scale atomic clock in response to a determination that the difference between the GNSS time signal and the chip-scale atomic clock time signal exceeds the threshold.

Example 12 includes the system of any of Examples 1-11, wherein the threshold increases nonlinearly over time based on a linear-in-time term and a sqrt(time) term until the chip-scale atomic clock is reinitialized.

Example 13 includes a method, comprising: determining whether a difference between a Global Navigation Satellite System (GNSS) time signal from a GNSS receiver and a chip-scale atomic clock time signal from a chip-scale atomic clock exceeds a threshold, wherein the threshold increases nonlinearly over time until the chip-scale atomic clock is reinitialized; estimating a system time signal using the GNSS time signal or the GNSS time signal and the chip-scale atomic clock time signal in response to a determination that the difference between the GNSS time signal and the chip-scale atomic clock time signal does not exceed the threshold; in response to a determination that the difference between the GNSS time signal and the chip-scale atomic clock time signal exceeds the threshold, estimating a system time signal using the chip-scale atomic clock time signal or time and error bounds of the chip-scale atomic clock, and outputting an alarm indicating that GNSS spoofing has been detected; and outputting the system time signal or a signal indicative of a system time error signal.

Example 14 includes the method of Example 13, further comprising providing a feedback signal from at least one processor to the chip-scale atomic clock based on a determined difference between the GNSS time signal and the chip-scale atomic clock time signal.

Example 15 includes the method of any of Examples 13-14, further comprising initializing the chip-scale atomic clock by modifying a chip-scale atomic clock time signal output by the chip-scale atomic clock based on the GNSS time signal from the GNSS receiver and/or a feedback signal from at least one processor.

Example 16 includes the method of any of Examples 13-15, further comprising: receiving time and frequency bounds for the chip-scale atomic clock; modeling time and frequency error bounds for the chip-scale atomic clock over time based on the received time and frequency bounds for the chip-scale atomic clock; and setting the threshold to correspond to the modeled time and frequency error bounds for the chip-scale atomic clock over time.

Example 17 includes the method of Example 16, wherein modeling the time and frequency error bounds for the chip-scale atomic clock includes using an Allan variance of one or more of bias, white noise, random walk, Gauss Markov, and flicker noise.

Example 18 includes the method of any of Examples 13-17, further comprising determining whether the difference between the GNSS time signal from the GNSS receiver and the chip-scale atomic clock time signal from the chip-scale atomic clock no longer exceeds a threshold; when the difference between the GNSS time signal from the GNSS receiver and the chip-scale atomic clock time signal from the chip-scale atomic clock no longer exceeds a threshold, switching to a mode of operation where the system time signal is estimated using the GNSS time signal.

Example 19 includes the method of any of Examples 13-18, wherein the threshold increases nonlinearly over time based on a linear-in-time term and a sqrt(time) term until the chip-scale atomic clock is reinitialized.

Example 20 includes a non-transitory computer readable medium having computer-executable instructions stored thereon which, when executed by one or more processing devices, cause the one or more processing devices to: receive a Global Navigation Satellite System (GNSS) time signal from a GNSS receiver communicatively coupled to an antenna and configured to receive GNSS signals from GNSS satellites via the antenna; receive a chip-scale atomic clock time signal from a chip-scale atomic clock; determine whether a difference between the GNSS time signal and the chip-scale atomic clock time signal exceeds a threshold that increases nonlinearly over time until the chip-scale atomic clock is reinitialized; estimate a system time signal using the GNSS time signal or the GNSS time signal and the chip-scale atomic clock time signal in response to a determination that the difference between the GNSS time signal and the chip-scale atomic clock time signal does not exceed the threshold; estimate a system time signal without using the GNSS time signal and output an alarm indicating that GNSS spoofing has been detected in response to a determination that the difference between the GNSS time signal and the chip-scale atomic clock time signal exceeds the threshold; and output the system time signal or a signal indicative of a system time error signal.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:
a Global Navigation Satellite System (GNSS) receiver communicatively coupled to an antenna, wherein the GNSS receiver is configured to receive GNSS signals from GNSS satellites via the antenna, wherein the GNSS receiver is configured to output a GNSS time signal;
a chip-scale atomic clock configured to output a chip-scale atomic clock time signal;
at least one processor coupled to a memory, wherein the at least one processor is communicatively coupled to the GNSS receiver and the chip-scale atomic clock, wherein the at least one processor is configured to:
determine whether a difference between the GNSS time signal and the chip-scale atomic clock time signal exceeds a threshold, wherein the threshold is based on error bounds of the chip-scale atomic clock and increases nonlinearly over time until the chip-scale atomic clock is reinitialized;
when the difference between the GNSS time signal and the chip-scale atomic clock time signal does not exceed the threshold, estimate a system time signal using the GNSS time signal or the GNSS time signal and the chip-scale atomic clock time signal;
when the difference between the GNSS time signal and the chip-scale atomic clock time signal exceeds the threshold, estimate a system time signal without using the GNSS time signal and output an alarm indicating that GNSS spoofing has been detected; and
output the system time signal or a signal indicative of a system time error.

2. The system of claim 1, wherein the at least one processor is further configured to provide a feedback signal to the chip-scale atomic clock based on the determined difference between the GNSS time signal and the chip-scale atomic clock time signal.

3. The system of claim 1, wherein the chip-scale atomic clock includes a microcontroller, wherein the microcontroller is configured to initialize the chip-scale atomic clock by modifying the chip-scale atomic clock time signal based on the GNSS time signal from the GNSS receiver and/or a feedback signal from the at least one processor.

4. The system of claim 1, further comprising:
a first summer communicatively coupled to the GNSS receiver and the chip-scale atomic clock, wherein the first summer is configured to:
receive the GNSS time signal from the GNSS receiver and the chip-scale atomic clock time signal from the chip-scale atomic clock;
determine a difference between the GNSS time signal and the chip-scale atomic clock; and
output the difference between the GNSS time signal and the chip-scale atomic clock to the at least one processor.

5. The system of claim 4, further comprising:
a second summer communicatively coupled to the at least one processor and the chip-scale atomic clock, wherein the second summer is configured to:

receive the chip-scale atomic clock time signal from the chip-scale atomic clock;

receive the signal indicative of the system time error;

add the chip-scale atomic clock time signal to the signal indicative of the system time error to generate the system time signal; and output the system time signal.

6. The system of claim 1, wherein the at least one processor is configured to output the system time signal.

7. The system of claim 1, wherein the at least one processor is further configured to:

receive time and frequency bounds for the chip-scale atomic clock;

model time and frequency error bounds for the chip-scale atomic clock over time based on the received time and frequency bounds for the chip-scale atomic clock; and set the threshold to correspond to the modeled time and frequency error bounds for the chip-scale atomic clock over time.

8. The system of claim 7, wherein the at least one processor is configured to model the time and frequency error bounds for the chip-scale atomic clock using an Allan variance of one or more of bias, white noise, random walk, Gauss Markov, and flicker noise.

9. The system of claim 1, wherein the system is configured to be mounted on or in a vehicle, carried by a person, mounted on a trailer, or mounted on a projectile.

10. The system of claim 9, further comprising one or more additional onboard systems, wherein the at least one processor is configured to output the alarm indicating the GNSS spoofing has been detected to the one or more additional onboard systems.

11. The system of claim 1, wherein the at least one processor is configured to estimate the signal indicative of the system time error as being equal to a maximum error for the chip-scale atomic clock in response to a determination that the difference between the GNSS time signal and the chip-scale atomic clock time signal exceeds the threshold.

12. The system of claim 1, wherein the threshold increases nonlinearly over time based on a linear-in-time term and a sqrt(time) term until the chip-scale atomic clock is reinitialized.

13. A method, comprising:

determining whether a difference between a Global Navigation Satellite System (GNSS) time signal from a GNSS receiver and a chip-scale atomic clock time signal from a chip-scale atomic clock exceeds a threshold, wherein the threshold is based on error bounds of the chip-scale atomic clock and increases nonlinearly over time until the chip-scale atomic clock is reinitialized;

estimating a system time signal using the GNSS time signal or the GNSS time signal and the chip-scale atomic clock time signal in response to a determination that the difference between the GNSS time signal and the chip-scale atomic clock time signal does not exceed the threshold;

in response to a determination that the difference between the GNSS time signal and the chip-scale atomic clock time signal exceeds the threshold, estimating a system time signal using the chip-scale atomic clock time signal or time and error bounds of the chip-scale atomic clock, and outputting an alarm indicating that GNSS spoofing has been detected; and outputting the system time signal or a signal indicative of a system time error.

14. The method of claim 13, further comprising providing a feedback signal from at least one processor to the chip-scale atomic clock based on a determined difference between the GNSS time signal and the chip-scale atomic clock time signal.

15. The method of claim 13, further comprising initializing the chip-scale atomic clock by modifying a chip-scale atomic clock time signal output by the chip-scale atomic clock based on the GNSS time signal from the GNSS receiver and/or a feedback signal from at least one processor.

16. The method of claim 13, further comprising:

receiving time and frequency bounds for the chip-scale atomic clock;

modeling time and frequency error bounds for the chip-scale atomic clock over time based on the received time and frequency bounds for the chip-scale atomic clock; and setting the threshold to correspond to the modeled time and frequency error bounds for the chip-scale atomic clock over time.

17. The method of claim 16, wherein modeling the time and frequency error bounds for the chip-scale atomic clock includes using an Allan variance of one or more of bias, white noise, random walk, Gauss Markov, and flicker noise.

18. The method of claim 13, further comprising determining whether the difference between the GNSS time signal from the GNSS receiver and the chip-scale atomic clock time signal from the chip-scale atomic clock no longer exceeds a threshold;

when the difference between the GNSS time signal from the GNSS receiver and the chip-scale atomic clock time signal from the chip-scale atomic clock no longer exceeds a threshold, switching to a mode of operation where the system time signal is estimated using the GNSS time signal.

19. The method of claim 13, wherein the threshold increases nonlinearly over time based on a linear-in-time term and a sqrt(time) term until the chip-scale atomic clock is reinitialized.

20. A non-transitory computer readable medium having computer-executable instructions stored thereon which, when executed by one or more processing devices, cause the one or more processing devices to:

receive a Global Navigation Satellite System (GNSS) time signal from a GNSS receiver communicatively coupled to an antenna and configured to receive GNSS signals from GNSS satellites via the antenna;

receive a chip-scale atomic clock time signal from a chip-scale atomic clock;

determine whether a difference between the GNSS time signal and the chip-scale atomic clock time signal exceeds a threshold, wherein the threshold is based on error bounds of the chip-scale atomic clock and increases nonlinearly over time until the chip-scale atomic clock is reinitialized;

estimate a system time signal using the GNSS time signal or the GNSS time signal and the chip-scale atomic clock time signal in response to a determination that the difference between the GNSS time signal and the chip-scale atomic clock time signal does not exceed the threshold;

estimate a system time signal without using the GNSS time signal and output an alarm indicating that GNSS spoofing has been detected in response to a determination that the difference between the GNSS time signal and the chip-scale atomic clock time signal exceeds the threshold; and output the system time signal or a signal indicative of a system time error.

\* \* \* \* \*